United States Patent [19]

Boman et al.

[11] 4,256,581
[45] Mar. 17, 1981

[54] APPARATUS FOR PREPARING GRANULAR MATERIAL BY MEANS OF A STRIP CASTER

[75] Inventors: Karl G. Boman; Konrad Schermutzki, both of Remseck, Fed. Rep. of Germany

[73] Assignee: Sandvik Conveyor GmbH, Fed. Rep. of Germany

[21] Appl. No.: 88,115

[22] Filed: Oct. 25, 1979

[30] Foreign Application Priority Data

Nov. 4, 1978 [DE] Fed. Rep. of Germany ....... 2847887

[51] Int. Cl.³ .............................................. B01D 35/02
[52] U.S. Cl. ................................... 210/173; 210/251; 210/497.01; 425/202
[58] Field of Search ............... 210/295, DIG. 15, 499, 210/497, 152, 251; 425/202; 264/13, 37

[56] References Cited

U.S. PATENT DOCUMENTS

| 828,715 | 8/1906 | Cook | 210/499 X |
| 913,768 | 3/1909 | Roberts | 210/497 X |
| 1,113,365 | 10/1914 | Maloney | 210/497 X |
| 3,538,200 | 11/1970 | Hittz | 264/13 |
| 3,607,499 | 9/1971 | Corbett et al. | 425/202 X |
| 3,817,377 | 6/1974 | Piggott | 210/DIG. 15 |
| 4,177,234 | 12/1979 | Lowry | 264/37 X |

FOREIGN PATENT DOCUMENTS 792252 3/1958 United Kingdom ..................... 425/202

Primary Examiner—Frank A. Spear, Jr.
Attorney, Agent, or Firm—Burns, Doane, Swecker & Mathis

[57] ABSTRACT

An apparatus for the preparation of granulate from hot-melting mixes comprises a pourer connected by a filter-containing conduit to at least one mixing and melting device. The strip pourer is disposed above a cooling conveyor which feeds to a crushing device. The pourer comprises a heated tubular body provided on its under side with discharge nozzles arranged in at least one row. A filter is disposed within the tubular body across the discharge nozzles to prevent unwanted particles from reaching the nozzles.

7 Claims, 5 Drawing Figures

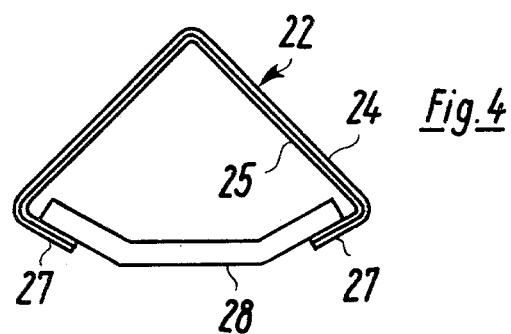
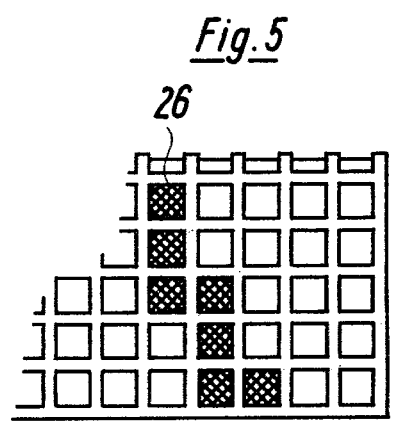

APPARATUS FOR PREPARING GRANULAR MATERIAL BY MEANS OF A STRIP CASTER

BACKGROUND AND OBJECTS OF THE INVENTION

The invention concerns an apparatus for preparing granular material from hot, melted mixes and especially of the type in which a pourer is connected, via filter-containing conduits, with at least one mixing and melting device, the pourer positioned above a cooling conveyor which feeds to a crushing device, wherein the pourer comprises a heated tubular body provided on its underside with discharge nozzles arranged in one or several rows.

By means of such an apparatus, it is possible to process waxes, fusion adhesives, resins, aliphatic alcohols or the like into granular material and fill and package same.

The melt is transferred from the melting device to the pourer, or strip coster by means of the filter containing conduit. The pourer deposits the melt in strip-form onto the conveyor, whereupon it is cooled and carried to the crusher for a crushing treatment. The filter arranged within the conduit upstream of the strip caster ensures that foreign bodies are extensively kept out of the material which is delivered to the strip caster for discharge from the latter. It has been shown with practical installations that certain difficulties arise because, in the area of tube bends or cross section junctions or in the area of valves, there occur points at which the melted material transported to the pourer or strip caster from the mixing and melting devices can become clogged slightly. These clogs can be released from time to time and over to the pourer as clumps or fragments. This can lead to blockage of the discharge nozzles so that the production performance drops. Since the valves and pipelines are heated, it can also occur that the clumps of material become overheated and burn or harden and are no longer able to fulfill their purpose. There then exists the danger that the parts may become loose, are discharged and become worked into the granular material. This can lead to adverse effects on the quality of the material produced with respect to optical appearance and for function.

The object of the invention is to provide an apparatus of the initially mentioned type so that clumps and/or material damaged by temperature or the like are prevented from being discharged through the discharge nozzles.

SUMMARY OF THE INVENTION

The inventors recognize that it would be possible but inconvenient technically to straighten and smooth the transport path between the conventional filter and pourer so that no material deposits can occur. It is technically simpler to connect directly in front of the discharge nozzles of the pourer a filter which segregates the loose clumps or deposits or the like from the area of the discharge nozzles so that the discharge nozzles cannot be clogged thereby and so that the material clumps or the like are not discharged.

In a constructional, more advantageous configuration of the invention, the filter comprises an insert within the pourer and extending over the entire length thereof. The pourer is provided on at least one end with a detachable cover. An insert of such a type protects the discharge nozzle quite well and is additionally even easily accessible for a cleaning since it can be removed from the tubular body through the detachable cover.

In a suitable configuration of the invention, it is provided that the insert is arranged roof-shaped above the discharge nozzles. At the same time, it is advisable for the insert to feature an angular cross section and be supported by its legs on the inside wall of the tubular body on both sides of the discharge nozzles. The cross sectional surface of the insert is accordingly relatively great in relationship to the total cross sections of the discharge nozzles so that a clogging of the insert is not to be feared. In order to securely fasten the insert above the area of the discharge nozzles, it is advantageous for the insert to be centered in grooves of the detachable cover.

In the advantageous form of construction of the invention, the insert is formed from two perforated plates which are connected with each other by spot welds and between which a filter mesh is inserted. An insert of such a type forms a very fine filter and has nevertheless a high inherent rigidity and form stability so that no supporting elements or such like have to be provided in the inside of the strip caster.

THE DRAWINGS

Further features and advantages of the invention result from the following description of one of the forms of construction depicted in the drawings.

FIG. 1 is a schematic representation of an apparatus according to the invention, FIG. 2 is a cross section through the pourer of FIG. 1 on a large scale, FIG. 3 is an axial section through the pourer of FIG. 2, FIG. 4 is a front view of a filter insert of the pourer of FIGS. 2 and 3 on a larger scale, and FIG. 5 is a view in the direction of arrow V to the pourer in FIG. 4.

DETAILED DESCRIPTION OF A PREFERRED EMBODIMENT OF THE INVENTION

Figure 1:
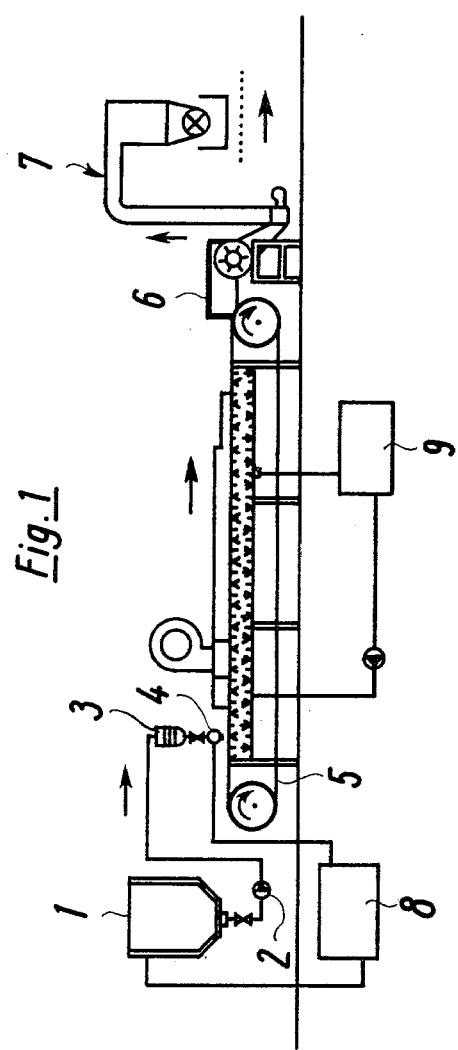

The apparatus shown in FIG. 1 for the preparation of a granular material from wax, fusion adhesive, resin or aliphatic alcohol or the like contains a mixing and melting apparatus 1 in which the raw material to be processed to granular material is mixed and prepared. From the mixing and melting device 1, the liquid raw material is delivered through a pump 2 and filter 3 to a pourer or strip caster 4. The latter is provided with discharge nozzles for discharging the liquid raw material in the form of a strip or ribbon onto a steel conveyor 5. The conveyor 5 is cooled and transports the solidifying strips to a crushing device 6 to which is connected a feeding and packaging device 7 for the finished granular material.

The mixing and melting device 1 as well as pump 2, filter 3 and strip caster 4 and the associated valves and lines are connected to a heating circuit which contains a device 8 for production of a hot medium, more particularly hot oil. The oil is circulated around walls of the various components to maintain such walls at a temperature which ensures that the material mixed together remains liquid. The steel conveyor 5, which is designed as a cooling conveyor, is connected in a well-known way to a water-cooling device 9 with which cooling water is sprayed from below against the underside of the steel conveyor 5.

Figure 2:
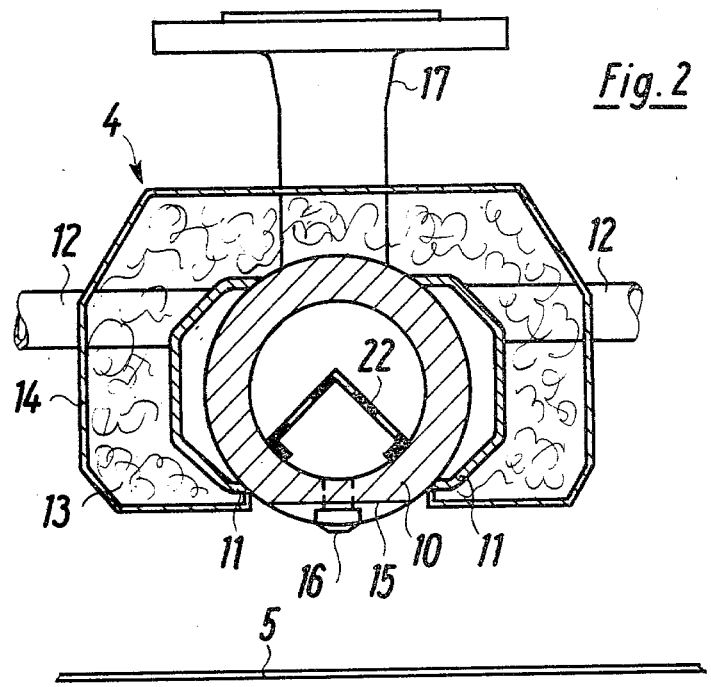
Figure 3:
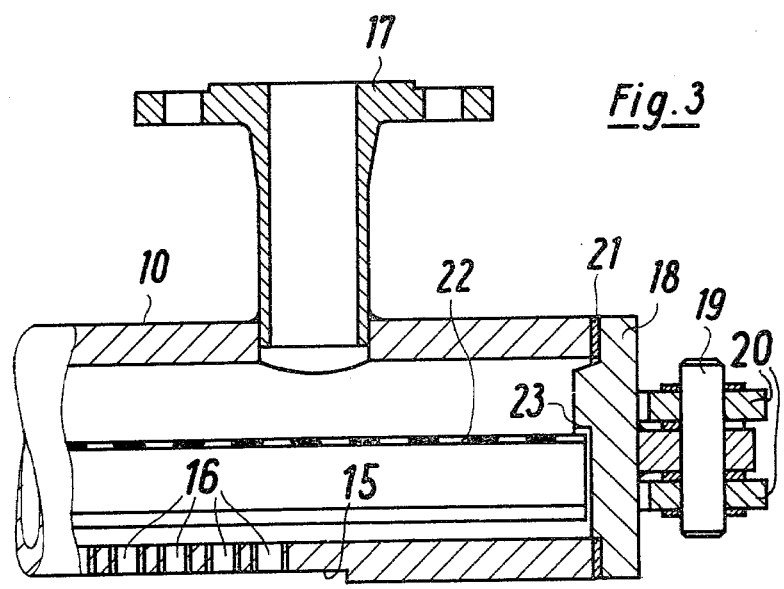

The strip caster 4 consists of a relatively thickwalled tubular body 10 (FIG. 2) which is partly enclosed by a steel jacket 11 which forms a cavity in which the heating medium is delivered and discharged through pipes 12. The tubular body 10 and the steel jacket 11 are enclosed by insulation 13 made of mineral wool which is enclosed by a steel jacket 14.

The tubular body 10 is provided int its lower area with a planar surface 15 which runs parallel to the steel conveyor 5 located therebeneath. In the area of this surface 15, discharge nozzles 16 are attached which comprise either boreholes of the tubular body 10, or special nozzles inserted into tap holes of the tubular body. The area of surface 15 is disposed externally of the insulation 13 and the steel jacket 11. One or two suspension connectors 17 for the material delivery are connected above to the tubular body 10. The number of connectors 17 is a function of the axial length of strip caster 4.

The tubular body is closed on both ends by detachable covers 18 which are supported on swingable levers 20, the latter each being rotatable about a vertical hinge pin 19 such that they can be swung open about a vertical axis to the outside of the ends of the hollow body 10. A sealing gasket 21 is provided between covers 18 and hollow body 10. Cover 18 can be pressed against the end of hollow body 10 by means of a threaded spindle and a locking nut on the side opposite the hinge or hinge arm 20.

In order to protect the discharge nozzles 16 against clogging and simultaneously to prevent unsuitable material from being discharged and poured out as strips onto steel conveyor 5, a filter insert 22 is provided inside tubular body 10 which covers the ends of discharge nozzles 16 located inside of the tubular hollow body 10. The filter insert 22 extends in an axial direction over the entire length of tubular hollow body 10. The insert 22 is preferably of a convex-concave configuration with the concave side facing downwardly. Various concave configurations may be employed, such as smooth arc-shaped insert, or by the depicted angular or inverted V-shaped cross section. The insert has two legs resting on the inside wall of the tubular hollow body 10 on opposite sides of the discharge nozzles 16. The outer edges of the two legs are bent inwardly toward one another. The legs of the filter insert 22 are somewhat longer than the inside radius of the inside wall of the tubular hollow body 10 so that the vertex of the filter insert 22 lies somewhat above the center axis of the tubular hollow body 10.

In order to fasten the filter insert 22 in the described position above the discharge nozzles 16, the covers 18 are provided with grooves 23 corresponding in shape to the cross sectional form of the filter insert 22 so that the filter insert 22 is centered and retained in the grooves. The filter insert 22 protects the delivery nozzles 16 quite well since it is no longer possible for any deposits to appear between the insert and the discharge nozzles. The insert 22 can easily be taken out of the tubular hollow body 10 by opening the lid 18 and then either cleaned or replaced by a new one when necessary.

The filter insert 22 comprises two perforated plates 24 and 25 (FIG. 4) laid on top of one another and between which a filter mesh 26 (FIG. 5) made of fine metal wire is inserted. The two perforated plates 24, 25 which feature square holes with relatively large cross sections are, at may points, connected with one another by spot welding, preferentially along the bent edges 27. The filter mesh 26 is inserted between the plates 24, 25 when the latter have their holes aligned. Thereafter, the plates are connected with one another by spot welding. Only afterwards are the two perforated plates 24 and 25 bent, together with the filter mesh 26, into the angle shape and with bent edges 27. In order to reinforce the filter insert 22, two diagonal trusses 28 are provided which interconnect the bent edges 27 and are welded to these edges. Each truss extends from one side of one end of the tubular body to other side of the other end of the body.

While the invention has been described in terms of various preferred embodiments, the skilled artisan will appreciate that various modifications, substitutions, ommission, and changes may be made without departing from the spirit thereof. Accordingly, it is intended that the scope of the present invention be limited solely by the scope of the following claims.

What is claimed is:

1. In apparatus for the preparation of granulate from hot-melt mixes, said apparatus comprising a strip pourer connected by a filter-containing conduit to at least one mixing and melting device, said strip pourer disposed above a cooling conveyor which receives melt from said pourer, cools the melt, and feeds the cooled melt to a crushing device, said pourer comprising a heated hollow tubular body provided on its under side with discharge nozzles arranged in at least one row, the improvement wherein a filter is disposed within said tubular body across said discharge nozzles, said filter comprising an elongate insert extending over the entire length of said tubular body and above said nozzles, the insert being of inverted substantially V-shaped cross-section and including two legs extending downwardly and engaging the inside wall of the tubular body on opposite sides of the discharge nozzles, and a detachable cover disposed on at least one end of said tubular body for replacement of said insert.

2. Apparatus according to claim 1 wherein lower ends of said legs are bent, and extend along the inside wall of the tubular body.

3. Apparatus according to claim 2 wherein said legs are bent toward one another.

4. Apparatus according to claim 1 wherein said cover includes a groove receiving the end of said insert.

5. Apparatus according to claim 1 wherein said legs are interconnected by means of diagonal trussing.

6. Apparatus according to claim 1 wherein said filter comprises two perforated metal plates interconnected by spot welding and a metallic filter mesh disposed between said plates.

7. Apparatus according to claim 1 wherein said legs are of longer length than the inner radius of said hollow tubular body such that a vertex defined by said legs is disposed above the center axis of the tubular body.

* * * * *